(12) United States Patent
Avedisov et al.

(10) Patent No.: US 12,266,265 B2
(45) Date of Patent: Apr. 1, 2025

(54) FEEDBACK SYSTEM FOR VEHICULAR END-TO-END DRIVING

(71) Applicant: TOYOTA JIDOSHA KABUSHIKI KAISHA, Toyota (JP)

(72) Inventors: Sergei Avedisov, Mountain View, CA (US); Gaurav Bansal, Mountain View, CA (US)

(*) Notice: Subject to any disclaimer, the term of this patent is extended or adjusted under 35 U.S.C. 154(b) by 529 days.

(21) Appl. No.: 16/508,152

(22) Filed: Jul. 10, 2019

(65) Prior Publication Data

US 2021/0012658 A1    Jan. 14, 2021

(51) Int. Cl.
| | |
|---|---|
| G08G 1/09 | (2006.01) |
| B60W 30/09 | (2012.01) |
| G08G 1/01 | (2006.01) |
| G08G 1/0967 | (2006.01) |
| G08G 1/16 | (2006.01) |

(52) U.S. Cl.
CPC ..... *G08G 1/096708* (2013.01); *G08G 1/0112* (2013.01); *G08G 1/096775* (2013.01); *G08G 1/167* (2013.01); *B60W 30/09* (2013.01); *G08G 1/092* (2013.01)

(58) Field of Classification Search
CPC ............. G08G 1/096708; G08G 1/167; G08G 1/096775; G08G 1/0112; G08G 1/092; G08G 1/164; B60W 30/09
See application file for complete search history.

(56) References Cited

U.S. PATENT DOCUMENTS

| | | | | |
|---|---|---|---|---|
| 10,599,155 | B1* | 3/2020 | Konrardy | B60W 60/0011 |
| 10,902,336 | B2* | 1/2021 | Lassoued | G06N 5/048 |
| 2018/0237005 | A1* | 8/2018 | Duan | B62D 15/0265 |
| 2019/0072960 | A1* | 3/2019 | Lin | B60W 40/09 |
| 2019/0088148 | A1* | 3/2019 | Jacobus | B60W 10/18 |
| 2019/0102689 | A1* | 4/2019 | Lassoued | G07C 5/085 |
| 2020/0142421 | A1* | 5/2020 | Palanisamy | G06N 3/08 |
| 2020/0312063 | A1* | 10/2020 | Balakrishnan | B60Q 9/00 |

\* cited by examiner

*Primary Examiner* — Tyler J Lee
(74) *Attorney, Agent, or Firm* — Burbage Law, P.C.; Jon-Michael Burbage

(57) ABSTRACT

Embodiments for improving driving commands for vehicular end-to-end driving include a method for a connected vehicle that includes receiving command data describing one or more driving commands for the connected vehicle. The method includes correcting the one or more driving commands to generate modified command data that describes one or more modified driving commands. The one or more modified driving commands control an operation of the connected vehicle to satisfy a trajectory safety requirement. The method includes modifying an operation of a vehicle control system of the connected vehicle based on the modified command data so that the connected vehicle operates based on the one or more modified driving commands.

20 Claims, 6 Drawing Sheets

FEEDBACK SYSTEM FOR VEHICULAR END-TO-END DRIVING

BACKGROUND

The specification relates to improving driving commands for vehicular end-to-end driving.

An autonomous vehicle may sense its environment and navigate to its destination without human inputs. For example, the autonomous vehicle may detect its surroundings using various sensors (e.g., radar, LIDAR, camera, etc.) to generate various sensor data. The autonomous vehicle may interpret the various sensor data to identify an appropriate navigation route to its destination. However, due to complexity of the driving environment, it can be difficult to ensure driving safety of the autonomous vehicle in some scenarios.

SUMMARY

One general aspect of embodiments described herein includes a computer program product including a non-transitory memory of an onboard vehicle computer system of a connected vehicle storing computer-executable code that, when executed by a processor, causes the processor to: receive command data describing one or more driving commands for the connected vehicle; correct the one or more driving commands to generate modified command data that describes one or more modified driving commands, where the one or more modified driving commands control the connected vehicle to operate within an intended lane of travel on a roadway and to maintain a safe distance relative to another vehicle present on the roadway so that a potential collision is avoided; and modify an operation of a vehicle control system of the connected vehicle based on the modified command data so that the connected vehicle operates based on the one or more modified driving commands. Other embodiments of this aspect include corresponding computer systems, apparatus, and computer programs recorded on one or more computer storage devices, each configured to perform the actions of the methods.

Implementations may include one or more of the following features. The computer program product where: the command data is received from a machine learning system; and the one or more modified driving commands further control the connected vehicle to operate in a manner consistent with model data provided by the machine learning system. The computer program product where the computer-executable code, when executed by the processor, causes the processor to correct the one or more driving commands to generate the modified command data at least by: receiving one or more of sensor data from one or more sensors of the connected vehicle and Vehicle-to-Everything (V2X) data from one or more other endpoints; and correcting the one or more driving commands to generate the one or more modified driving commands based on the one or more of the sensor data and the V2X data. The computer program product where: the one or more driving commands include one or more of a steering command, a throttle command and a braking command; and the one or more modified driving commands include a modified version of the one or more of the steering command, the throttle command and the braking command. Implementations of the described techniques may include hardware, a method or process, or computer software on a computer-accessible medium.

One general aspect includes a method for a connected vehicle, including: receiving command data describing one or more driving commands for the connected vehicle; correcting the one or more driving commands to generate modified command data that describes one or more modified driving commands, where the one or more modified driving commands control an operation of the connected vehicle to satisfy a trajectory safety requirement; and modifying an operation of a vehicle control system of the connected vehicle based on the modified command data so that the connected vehicle operates based on the one or more modified driving commands. Other embodiments of this aspect include corresponding computer systems, apparatus, and computer programs recorded on one or more computer storage devices, each configured to perform the actions of the methods.

Implementations may include one or more of the following features. The method where the trajectory safety requirement includes a lane-of-travel requirement, and the one or more modified driving commands control the connected vehicle to operate within an intended lane of travel on a roadway. The method where the trajectory safety requirement includes a collision-avoidance requirement, and the one or more modified driving commands control the connected vehicle to maintain a safe distance relative to another vehicle present on a roadway of the connected vehicle so that a potential collision is avoided. The method where: the command data is received from a machine learning system; and the one or more modified driving commands further control the connected vehicle to operate in a manner consistent with model data provided by the machine learning system. The method where correcting the one or more driving commands to generate the modified command data that describes the one or more modified driving commands includes: receiving one or more of sensor data from one or more sensors of the connected vehicle and V2X data from one or more other endpoints; and correcting the one or more driving commands to generate the one or more modified driving commands based on the one or more of the sensor data and the V2X data. The method where correcting the one or more driving commands to generate the one or more modified driving commands based on the one or more of the sensor data and the V2X data includes: inferring a trajectory of the connected vehicle based on the one or more driving commands and the one or more of the sensor data and the V2X data; and responsive to determining that the trajectory of the connected vehicle does not satisfy the trajectory safety requirement, modifying the one or more driving commands to form the one or more modified driving commands so that a modified trajectory that satisfies the trajectory safety requirement is produced for the connected vehicle based on the modified driving commands. The method where the sensor data includes one or more of location data describing a geographic location of the connected vehicle and inertial measurement data received from an inertial measurement unit of the connected vehicle. The method where: the one or more driving commands include one or more of a steering command, a throttle command, and a braking command; and the one or more modified driving commands include a modified version of the one or more of the steering command, the throttle command, and the braking command. Implementations of the described techniques may include hardware, a method or process, or computer software on a computer-accessible medium.

One general aspect includes a system including an onboard vehicle computer system of a connected vehicle including a non-transitory memory storing computer code which, when executed by the onboard vehicle computer system, causes the onboard vehicle computer system to:

receive command data describing one or more driving commands for the connected vehicle; correct the one or more driving commands to generate modified command data that describes one or more modified driving commands, where the one or more modified driving commands control an operation of the connected vehicle to satisfy a trajectory safety requirement; and modify an operation of a vehicle control system of the connected vehicle based on the modified command data so that the connected vehicle operates based on the one or more modified driving commands. Other embodiments of this aspect include corresponding computer systems, apparatus, and computer programs recorded on one or more computer storage devices, each configured to perform the actions of the methods.

Implementations may include one or more of the following features. The system where the trajectory safety requirement includes a lane-of-travel requirement, and the one or more modified driving commands control the connected vehicle to operate within an intended lane of travel on a roadway. The system where the trajectory safety requirement includes a collision-avoidance requirement, and the one or more modified driving commands control the connected vehicle to maintain a safe distance relative to another vehicle present on a roadway of the connected vehicle so that a potential collision is avoided. The system where: the command data is received from a machine learning system; and the one or more modified driving commands further control the connected vehicle to operate in a manner consistent with model data provided by the machine learning system. The system where the computer code, when executed by the onboard vehicle computer system, causes the onboard vehicle computer system to correct the one or more driving commands to generate the modified command data that describes the one or more modified driving commands at least by: receiving one or more of sensor data from one or more sensors of the connected vehicle and V2X data from one or more other endpoints; and correcting the one or more driving commands to generate the one or more modified driving commands based on the one or more of the sensor data and the V2X data. The system where the computer code, when executed by the onboard vehicle computer system, causes the onboard vehicle computer system to correct the one or more driving commands to generate the one or more modified driving commands based on the one or more of the sensor data and the V2X data at least by: inferring a trajectory of the connected vehicle based on the one or more driving commands and the one or more of the sensor data and the V2X data; and responsive to determining that the trajectory of the connected vehicle does not satisfy the trajectory safety requirement, modifying the one or more driving commands to form the one or more modified driving commands so that a modified trajectory that satisfies the trajectory safety requirement is produced for the connected vehicle based on the modified driving commands. The system where the sensor data includes one or more of location data describing a geographic location of the connected vehicle and inertial measurement data received from an inertial measurement unit of the connected vehicle. The system where: the one or more driving commands include one or more of a steering command, a throttle command, and a braking command; and the one or more modified driving commands include a modified version of the one or more of the steering command, the throttle command, and the braking command. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
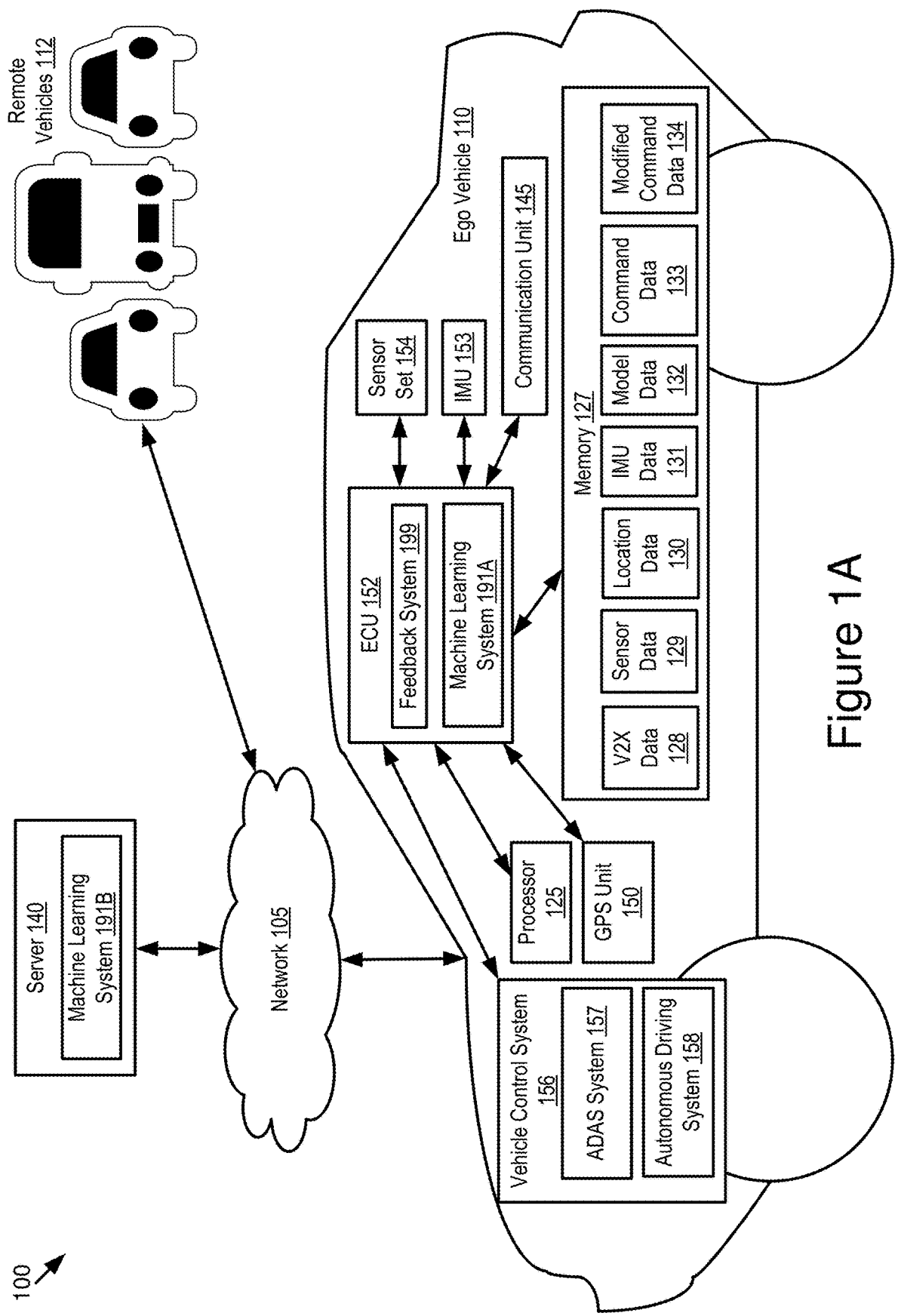
FIG. 1A is a block diagram illustrating an operating environment for a machine learning system and a feedback system according to some embodiments.

A machine learning system may use sensor data (e.g., camera data, range data, radar data, V2X data) as inputs to a complex convolutional neural network (CCNN) to provide an autonomous driving service to a vehicle. For example, the machine learning system learns corresponding driving commands to provide to the vehicle (e.g., commands for a steering wheel, throttle, brake, etc.). The autonomous driving service may imitate human driving and an automated driving system controlled by the driving commands from the CCNN may drive similar to how humans drive and can learn to drive like a specific person. Accordingly, this autonomous driving service may provide customers with a highly customized and comfortable automated driving experience.

However, it is difficult to determine whether vehicles steered by a CCNN may stay in their lane of travel. It is also difficult to determine whether vehicles whose acceleration or braking is controlled by a CCNN may maintain a safe distance relative to other vehicles traveling ahead of them (or behind them).

Described herein are embodiments of a feedback system installed in a connected vehicle that is operable to modify driving commands provided by a CCNN or some other machine learning system to generate modified driving commands. As a result, the connected vehicle controlled by the modified driving commands is steered in a way that maintains a correct lane of travel. The connected vehicle is also accelerated or braked in a way that maintains a safe distance relative to another vehicle traveling ahead of or behind the connected vehicle.

Example improvements and advantages provided by the feedback system described herein are described here. For example, through a modification of driving commands provided by the machine learning system, the feedback system provides a guarantee that the connected vehicle is steered in a way that maintains a correct lane of travel. The feedback system also provides a guarantee that the connected vehicle is accelerated or braked in a way that maintains a safe distance relative to another vehicle traveling ahead of or behind the connected vehicle. In this way, a driving safety of the connected vehicle is improved.

An example overview of the machine learning system and the feedback system is provided here. The machine learning system can be installed in the connected vehicle and analyze sensor measurements (e.g., videos and images) to learn how to drive the connected vehicle like a human. The machine learning system outputs command data describing driving commands (e.g., steering, throttle, and braking commands, etc.) for a vehicle control system of the connected vehicle to control the driving of the connected vehicle.

In some embodiments, the machine learning system is a CCNN. In some embodiments, the vehicle control system is an Advanced Driver Assistance System (ADAS system) or an autonomous driving system. Architecturally, the feedback system is positioned between the machine learning system and the vehicle control system.

The connected vehicle includes a communication unit, a global positioning system (GPS) unit and an inertial measurement unit (IMU). The feedback system receives the command data from the machine learning system. The feedback system receives V2X data from other vehicles and sensor data (e.g., GPS data and IMU data, etc.) from one or more sensors of the connected vehicle. The feedback system analyzes the V2X data, the GPS data and the IMU data as feedback to determine corrections for the command data. The feedback system then outputs modified command data that describes modified driving commands to the vehicle control system so that the operation of the connected vehicle is controlled based on the modified command data.

As described herein, examples of V2X communications include Dedicated Short-Range Communication (DSRC) (including Basic Safety Messages (BSMs) and Personal Safety Messages (PSMs), among other types of DSRC communication). Further examples of V2X communications include: Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); or Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X message) described herein include, but are not limited to, the following messages: a DSRC message; a BSM message; and an LTE message. Further examples of a wireless message include one or more of the following: an LTE-V2X message (e.g., an LTE-V2V message, an LTE-V2I message, an LTE-V2N message, etc.); a 5G-V2X message; and a millimeter wave message, etc.

Example Overview

Referring to FIG. 1A, depicted is an operating environment 100 for a feedback system 199 and a machine learning system 191 according to some embodiments. The operating environment 100 may include one or more of the following elements: an ego vehicle 110; and one or more remote vehicles 112. In some embodiments, the operating environment 100 may also include a server 140. These elements of the operating environment 100 may be communicatively coupled to a network 105. In practice, the operating environment 100 may include any number of ego vehicles 110, remote vehicles 112, servers 140 and networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS) and multimedia messaging service (MMS). In some embodiments, the network 105 further includes networks for hypertext transfer protocol (HTTP), direct data connection, wireless application protocol (WAP), e-mail, DSRC, full-duplex wireless communication and mmWave. In some embodiments, the network 105 further includes networks for WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE, 5G-V2X or any other mobile data network or combination of mobile data networks. Further, the network 105 may include one or more IEEE 802.11 wireless networks.

The ego vehicle 110 may be any type of vehicle. For example, the ego vehicle 110 may include one of the following types of vehicles: a car; a truck; a sports utility vehicle; a bus; a semi-truck; a drone; or any other roadway-based conveyance. The ego vehicle 110 may be a connected vehicle that includes a communication unit and is capable of communicating with other endpoints connected to the network 105.

In some embodiments, the ego vehicle 110 is a DSRC-enabled vehicle which includes a DSRC radio and a DSRC-compliant GPS unit. The ego vehicle 110 may also include other V2X radios besides a DSRC radio. DSRC is not a requirement of embodiments described herein, and any form of V2X communications is also feasible.

The ego vehicle 110 may include one or more of the following elements: a processor 125; a memory 127; a communication unit 145; a GPS unit 150; an electronic control unit (ECU) 152; an IMU 153; a sensor set 154; a vehicle control system 156; and a feedback system 199. In some embodiments, the ego vehicle 110 also includes an instance of the machine learning system (e.g., a machine learning system 191A). These elements of the ego vehicle 110 may be communicatively coupled to one another via a bus.

In some embodiments, the processor 125 and the memory 127 may be elements of an onboard vehicle computer system (such as computer system 200 described below with reference to FIG. 2). The onboard vehicle computer system may be operable to cause or control the operation of the feedback system 199. For example, the onboard vehicle computer system may be operable to access and execute the data stored on the memory 127 to provide the functionality described herein for the feedback system 199 or its elements (see, e.g., FIG. 2).

The processor 125 includes an arithmetic logic unit, a microprocessor, a general-purpose controller, or some other processor array to perform computations and provide electronic display signals to a display device. The processor 125 processes data signals and may include various computing architectures. Example computing architectures include a complex instruction set computer (CISC) architecture, a reduced instruction set computer (RISC) architecture, or an architecture implementing a combination of instruction sets. The ego vehicle 110 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media. Example permanent storage devices include a hard disk drive, a floppy disk drive, a CD-ROM device, a DVD-ROM device, a DVD-RAM device, a DVD-RW device, and a flash memory device, etc. Additional example permanent storage devices may include some other mass storage device for storing information on a more permanent basis. The ego vehicle 110 may include one or more memories 127.

The memory 127 may store one or more of the following elements: V2X data 128; sensor data 129; location data 130; IMU data 131; model data 132; command data 133; and modified command data 134.

In some embodiments, the V2X data 128 may include sensor data received from one or more other endpoints (e.g., remote vehicles 112, roadside units, etc.) in the vicinity of the ego vehicle 110. The sensor data of a particular endpoint may include one or more of: location data describing a location of the endpoint; and other sensor data describing other sensor measurements (e.g., a velocity, heading, etc.) of the endpoint. The endpoint may broadcast or unicast its V2X data to the ego vehicle 110 via a wireless V2X message.

The sensor data 129 includes digital data describing sensor measurements recorded by sensors included in the sensor set 154. For example, the sensor data 129 may include digital data describing sensor measurements recorded by one or more of the following: exterior cameras; interior cameras; radar; LIDAR; other range-finding sensors besides radar or LIDAR; the GPS unit 150; and the IMU 153, etc.

The location data 130 may include digital data describing a geographic location of the ego vehicle 110. For example, the location data 130 includes GPS data describing a GPS position of the ego vehicle 110.

The IMU data 131 may include digital data describing inertia measurements of the ego vehicle 110.

The model data 132 may include digital data that describes a driving model for a driver that operates the ego vehicle 110. The driving model may describe how to drive the ego vehicle 110 like a specific human. For example, the sensor data 129 includes images and videos depicting how the driver of the ego vehicle 110 operates the ego vehicle 110 in different contexts or scenarios. The machine learning system 191 analyzes the videos and images and generates the model data 132 based on the analysis of the images and videos. The model data 132 includes digital data that describes how the driver operates the ego vehicle 110 in different contexts or driving scenarios as directly evidenced by the images and videos or inferred by the machine learning system 191.

The command data 133 includes digital data describing one or more driving commands provided by the machine learning system 191. The modified command data 134 includes digital data describing one or more modified driving commands. For example, the one or more driving commands include one or more of a steering command, a throttle command, and a braking command, etc. The one or more modified driving commands include a modified version of the steering command, the throttle command, and the braking command, etc.

The communication unit 145 transmits and receives data to and from the network 105 or to another communication channel. In some embodiments, the communication unit 145 may include a DSRC transceiver, a DSRC receiver and other hardware or software necessary to make the ego vehicle 110 a DSRC-enabled device. For example, the communication unit 145 includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods. Example wireless communication methods may include one or more of the following: IEEE 802.11; and IEEE 802.16, BLUETOOTH®. Example wireless communication methods may further include EN ISO 14906:2004 Electronic Fee Collection—Application interface EN 11253:2004 DSRC—Physical layer using microwave at 5.8 GHz (review). Example wireless communication methods may further include EN 12795: 2002 DSRC—DSRC Data link layer: Medium Access and Logical Link Control (review). Example wireless communication methods may further include EN 12834:2002 DSRC—Application layer (review) and EN 13372:2004 DSRC—DSRC profiles for RTTT applications (review). Example wireless communication methods may further include the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a cellular communications transceiver for sending and receiving data over a cellular communications network. For example, the data may be sent or received via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The communication unit 145 may include a V2X radio. The V2X radio may include a hardware element including a DSRC transmitter which is operable to transmit DSRC messages on the 5.9 GHz band. The 5.9 GHz band is reserved for DSRC messages. The hardware element may also include a DSRC receiver which is operable to receive DSRC messages on the 5.9 GHz band.

In some embodiments, the GPS unit 150 is a conventional GPS unit of the ego vehicle 110. For example, the GPS unit 150 may include hardware that wirelessly communicates with a GPS satellite to retrieve data that describes a geographic location of the ego vehicle 110. In some embodiments, the GPS unit 150 is a DSRC-compliant GPS unit of the ego vehicle 110. The DSRC-compliant GPS unit is operable to provide GPS data describing the geographic location of the ego vehicle 110 with lane-level accuracy.

The ECU 152 can include one or more processors and one or more memories. The ECU 152 may control an operation of the vehicle control system 156, the sensor set 154, the feedback system 199 and the machine learning system 191A of the ego vehicle 110. In some embodiments, the feedback system 199 and the machine learning system 191A of the ego vehicle 110 are installed in the ECU 152.

The IMU 153 may include software, hardware, or a combination thereof for generating the IMU data 131 that describes inertia measurements of the ego vehicle 110.

The sensor set 154 includes one or more sensors that are operable to measure a roadway environment outside of the ego vehicle 110. For example, the sensor set 154 may include one or more sensors that record one or more physical characteristics of the roadway environment that is proximate to the ego vehicle 110. The memory 127 may store sensor data that describes the one or more physical characteristics recorded by the sensor set 154.

The sensor set 154 may also include various sensors that record an environment internal to a cabin of the ego vehicle 110. For example, the sensor set 154 includes onboard sensors which monitor the environment of the ego vehicle 110 whether internally or externally. In a further example, the sensor set 154 includes cameras, LIDAR, radars, infrared sensors, and sensors that observe the behavior of the driver such as internal cameras, biometric sensors, etc.

In some embodiments, the sensor set 154 may include one or more of the following vehicle sensors: a camera; a LIDAR sensor; a radar sensor; a laser altimeter; an infrared detector; a motion detector; a thermostat; and a sound detector. The sensor set 154 may also include one or more of the following sensors: a carbon monoxide sensor; a carbon dioxide sensor; an oxygen sensor; a mass air flow sensor; and an engine coolant temperature sensor. The sensor set 154 may also include one or more of the following sensors: a throttle position sensor; a crank shaft position sensor; an automobile engine sensor; a valve timer; an air-fuel ratio meter; and a blind spot meter. The sensor set 154 may also include one or more of the following sensors: a curb feeler; a defect detector; a Hall effect sensor, a manifold absolute pressure sensor; a parking sensor; a radar gun; a speedometer; and a speed sensor. The sensor set 154 may also include one or more of the following sensors: a tire-pressure monitoring sensor; a torque sensor; a transmission fluid temperature sensor; and a turbine speed sensor (TSS); a variable reluctance sensor; and a vehicle speed sensor (VSS). The sensor set 154 may also include one or more of the following sensors: a water sensor; a wheel speed sensor; and any other type of automotive sensor.

The vehicle control system 156 may control an operation of the ego vehicle 110. For example, the vehicle control system 156 may provide some or all of the autonomous functionality for the ego vehicle 110. In some embodiments, the vehicle control system 156 may include one or more ADAS systems 157, an autonomous driving system 158 or a combination thereof.

The remote vehicle 112 present on a roadway of the ego vehicle 110 may have a structure similar to that of the ego vehicle 110. Similar description will not be repeated here.

The server 140 may be one of a cloud server, an edge server, or any other processing device. The server 140 includes an instance of the machine learning system (e.g., a machine learning system 191B) and any other appropriate components. For example, the machine learning system 191 is an element of the server 140 and not installed in the ego vehicle 110 itself.

The machine learning systems 191A and 191B may have a similar structure and provide similar functionality and may be referred to herein as "machine learning system 191" individually or collectively.

In some embodiments, the machine learning system 191 includes software that is operable to analyze videos and images included in the sensor data generated by the sensor set 154 and output command data describing driving commands for the vehicle control system 156. In some embodiments, the machine learning system 191 may be implemented using hardware including a field-programmable gate array ("FPGA") or an application-specific integrated circuit ("ASIC"). In some other embodiments, the machine learning system 191 may be implemented using a combination of hardware and software. The machine learning system 191 may be stored in a combination of the devices (e.g., servers or other devices), or in one of the devices.

The machine learning system 191 is described below in more detail with reference to FIGS. 1B and 4-5.

In some embodiments, the feedback system 199 includes software that is operable, when executed by the processor 125, to cause the processor 125 to execute one or more steps of a method 300 described below with reference to FIG. 3. In some embodiments, the feedback system 199 may be implemented using hardware including an FPGA or an ASIC. In some other embodiments, the feedback system 199 may be implemented using a combination of hardware and software. The feedback system 199 may be stored in a combination of the devices (e.g., servers or other devices), or in one of the devices.

The feedback system 199 is described below in more detail with reference to FIGS. 1B-5.

Figure 1B:
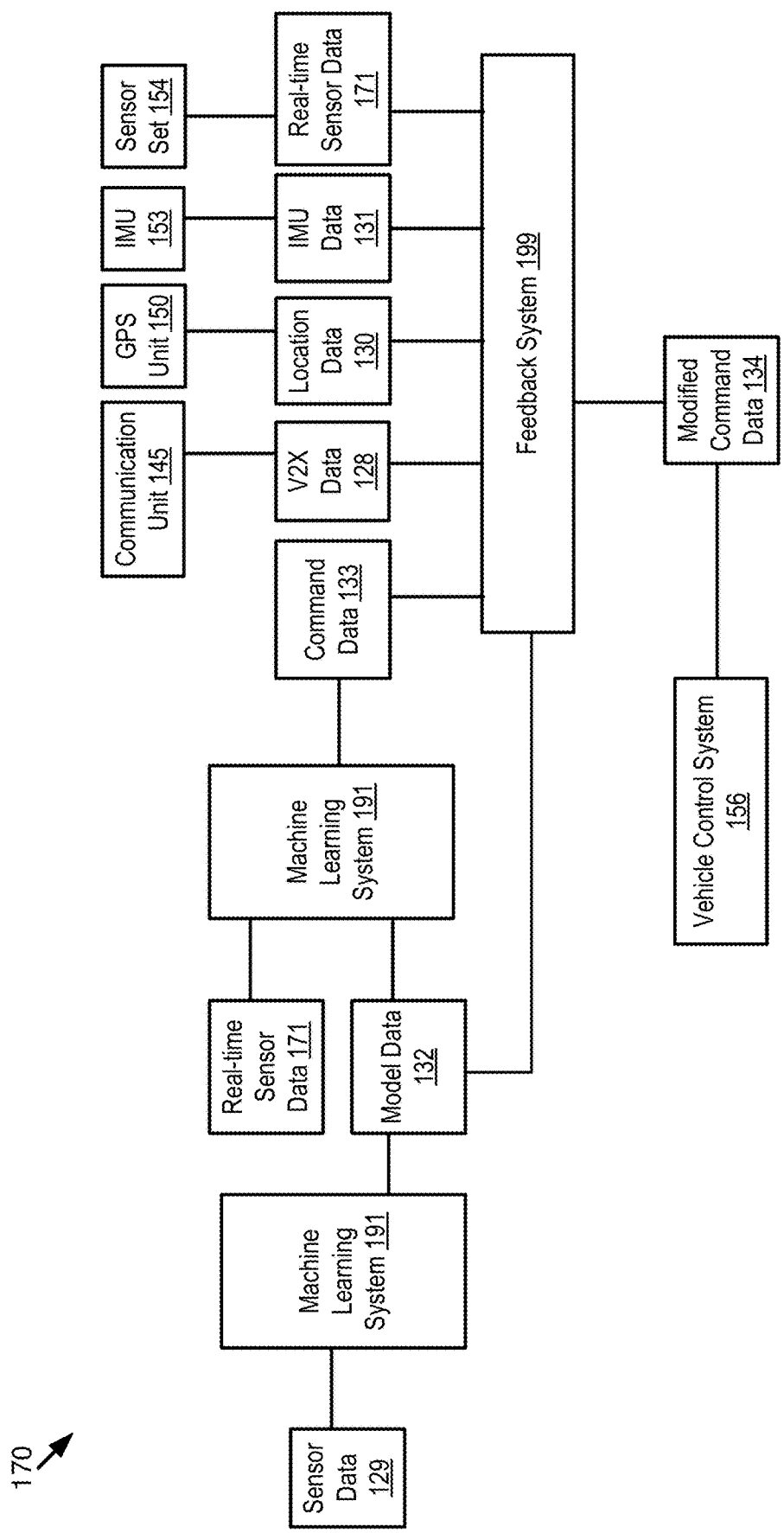
FIG. 1B is a block diagram illustrating an architecture including the machine learning system and the feedback system according to some embodiments.

Referring now to FIG. 1B, illustrated is an architecture 170 including the machine learning system 191 and the feedback system 199 according to some embodiments. The machine learning system 191 may include a CCNN (e.g., a convolutional recurrent neural network (CRNN)). The machine learning system 191 is operable to analyze the sensor data 129 (e.g., videos and images) generated by the sensor set 154 and to learn how to drive the ego vehicle 110 like a human. For example, the machine learning system 191 generates the model data 132 describing how a particular human drives the ego vehicle 110 based on an analysis of the videos and images.

Then, the machine learning system 191 generates the command data 133 based on the model data 132 and real-time sensor data 171 generated by the sensor set 154. For example, the machine learning system 191 continuously analyzes the real-time sensor data 171 to assess a current driving situation or scenario. Based on the current driving situation or scenario, the machine learning system 191 outputs the command data 133 describing one or more driving commands for the vehicle control system 156 to control the driving of the ego vehicle 110 in real time. The one or more driving commands include a steering command, a throttle command, a braking command, or any combination thereof. As a result, the ego vehicle 110 is operated in a manner that is consistent with the operation of the ego vehicle 110 which is described by the model data 132.

Architecturally, the feedback system 199 is positioned between the machine learning system 191 and the vehicle control system 156. Driving commands generated by the machine learning system 191 that are intended to provide to the vehicle control system 156 are first received, inspected, and, if needed, modified by the feedback system 199. The feedback system 199 then issues control inputs (which may or may not be modified) to the vehicle control system 156 (see, e.g., the modified command data 134 as described below).

For example, the feedback system 199 receives the command data 133 and an instance of the model data 132 from the machine learning system 191. The feedback system 199 receives the V2X data 128 (if there is any) from one or more other endpoints (e.g., remote vehicles 112). The feedback system 199 receives the location data 130 from the GPS unit 150, the IMU data 131 from the IMU 153 and the real-time sensor data 171 from sensors in the sensor set 154. The feedback system 199 is operable to analyze the V2X data 128, the location data 130, the IMU data 131, the real-time sensor data 171 or any combination thereof as feedback to determine corrections for the command data 133. The feedback system 199 incorporates the corrections into the command data 133 to generate the modified command data 134.

In some embodiments, the modified command data 134 describes one or more modified driving commands that provide a guarantee that the ego vehicle 110 continues to be operated in a manner consistent with the model data 132.

In some embodiments, the one or more modified driving commands also provide a guarantee that an operation of the ego vehicle 110 satisfies a trajectory safety requirement. For example, the trajectory safety requirement includes a lane-of-travel requirement. The one or more modified driving commands control the ego vehicle 110 to operate within an intended lane of travel on a roadway. In another example, the trajectory safety requirement includes a collision-avoidance requirement. The one or more modified driving commands control the ego vehicle 110 to maintain a safe distance relative to another vehicle present on the roadway of the ego vehicle 110 so that a potential collision with the other vehicle is avoided.

In some embodiments, the modified command data 134 includes digital data that describes a version of the command data 133 that is modified to include the corrections described above and therefore provide the guarantee described above. The feedback system 199 is operable to output the modified command data 134 to the vehicle control system 156. The feedback system 199 causes the vehicle control system 156 to operate based on the modified command data 134 so that the operation of the ego vehicle 110 is controlled by the vehicle control system 156 based on the modified driving commands.

As a result, the feedback system 199 may modify the operation of the machine learning system 191 by improving the driving commands outputted by the machine learning system 191 to generate the modified driving commands. The feedback system 199 provides the modified driving commands to the vehicle control system 156 to provide a guarantee that the ego vehicle 110 is steered in a way by the vehicle control system 156 that maintains a correct lane of travel. The modified driving commands also provide a guarantee that the ego vehicle 110 is accelerated or braked by the vehicle control system 156 in a way that maintains a safe distance relative to another vehicle traveling ahead of (or behind) the ego vehicle 110.

Example Computer System

Figure 2:
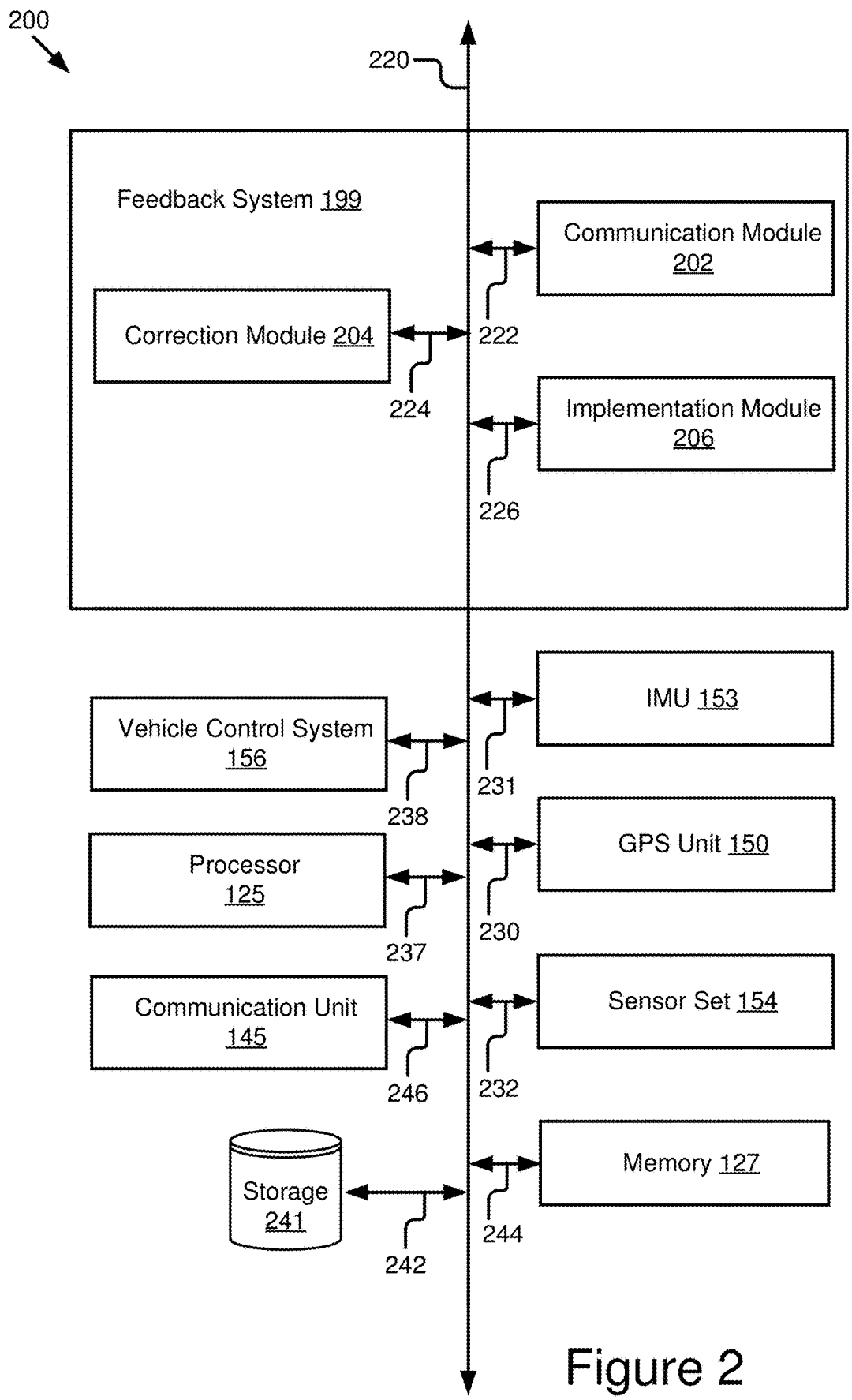
FIG. 2 is a block diagram illustrating an example computer system including the feedback system according to some embodiments.

Referring now to FIG. 2, depicted is a block diagram illustrating an example computer system 200 including the feedback system 199 according to some embodiments. In some embodiments, the computer system 200 may include a special-purpose computer system that is programmed to perform one or more steps of the method 300 described below with reference to FIG. 3.

In some embodiments, the computer system 200 may be an element of the ego vehicle 110. In some embodiments, the computer system 200 may be an onboard vehicle computer of the ego vehicle 110. In some embodiments, the computer system 200 may include an engine control unit, head unit or some other processor-based computing device of the ego vehicle 110.

The computer system 200 may include one or more of the following elements according to some examples: the feedback system 199; the processor 125; and the communication unit 145. The computer system 200 may further include one or more of the following elements: the sensor set 154; the GPS unit 150; the IMU 153; the memory 127; the vehicle control system 156; and a storage 241. The components of the computer system 200 are communicatively coupled by a bus 220.

In the illustrated embodiment, the processor 125 is communicatively coupled to the bus 220 via a signal line 237. The vehicle control system 156 is communicatively coupled to the bus 220 via a signal line 238. The communication unit 145 is communicatively coupled to the bus 220 via a signal line 246. The storage 241 is communicatively coupled to the bus 220 via a signal line 242. The GPS unit 150 is communicatively coupled to the bus 220 via a signal line 230. The IMU 153 is communicatively coupled to the bus 220 via a signal line 231. The sensor set 154 is communicatively coupled to the bus 220 via a signal line 232. The memory 127 is communicatively coupled to the bus 220 via a signal line 244.

The following elements are described above with reference to FIG. 1A: the processor 125; the communication unit 145; the sensor set 154; the GPS unit 150; the IMU 153; the vehicle control system 156; and the memory 127. Those descriptions will not be repeated here.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media (e.g., a hard disk drive, a floppy disk drive, a flash memory device, etc.) for storing information on a more permanent basis.

In the illustrated embodiment shown in FIG. 2, the feedback system 199 includes: a communication module 202; a correction module 204; and an implementation module 206. These components of the feedback system 199 are communicatively coupled to each other via the bus 220. In some embodiments, components of the feedback system 199 can be stored in a single server or device. In some other embodiments, components of the feedback system 199 can be distributed and stored across multiple servers or devices.

The communication module 202 can be software including routines for handling communications between the feedback system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. For example, the communication module 202 receives or transmits, via the communication unit 145, V2X data of remote vehicles 112 or V2X data of the ego vehicle 110. The communication module 202 may send or receive any of the data or messages described above with reference to FIGS. 1A-1B via the communication unit 145.

In some embodiments, the communication module 202 receives data from the other components of the feedback system 199 and stores the data in one or more of the storage 241 and the memory 127. The other components of the feedback system 199 may cause the communication module 202 to communicate with the other elements of the computer system 200 or the operating environment 100 (via the communication unit 145). For example, the correction module 204 may use the communication module 202 to communicate with the sensor set 154 and cause the sensor set 154 to record sensor data.

The correction module 204 can be software including routines for generating modified command data that describes one or more modified driving commands. In some embodiments, the correction module 204 can be stored in the memory 127 of the computer system 200 and can be accessible and executable by the processor 125. The correction module 204 may be adapted for cooperation and communication with the processor 125 and other components of the computer system 200 via a signal line 224.

In some embodiments, the correction module 204 receives one or more of (1) sensor data from one or more sensors of the ego vehicle 110 and (2) V2X data from one or more other endpoints (e.g., one or more remote vehicles 112). For example, the correction module 204 is operable to cause the sensor set 154 to record sensor data that describes one or more sensor measurements of the ego vehicle 110 in real time. The sensor data includes one or more of: (1) location data describing a geographic location of the ego vehicle 110; (2) inertial measurement data received from the IMU 153; and (3) other sensor data recorded by any other sensors of the ego vehicle 110 in real time. For example, the other sensor data may include data describing one or more of a velocity, a heading, an acceleration, etc., of the ego vehicle 110.

In some embodiments, the correction module 204 receives (1) command data describing one or more driving commands for the ego vehicle 110 and (2) model data from the machine learning system 191. The correction module 204 corrects the one or more driving commands to generate modified command data describing one or more modified driving commands based on one or more of the sensor data of the ego vehicle 110, the V2X data of other endpoints and the model data.

For example, the correction module 204 infers a trajectory of the ego vehicle 110 based on the one or more driving commands, the model data and one or more of the sensor data and the V2X data. The correction module 204 determines whether the trajectory of the ego vehicle 110 satisfies a trajectory safety requirement. Responsive to determining that the trajectory satisfies the trajectory safety requirement, the correction module 204 does not modify the one or more driving commands and forwards the one or more driving commands to the vehicle control system 156 directly. Responsive to determining that the trajectory of the ego vehicle 110 does not satisfy the trajectory safety requirement, the correction module 204 modifies the one or more driving commands to form the one or more modified driving commands. As a result, a modified trajectory that satisfies the trajectory safety requirement is produced for the ego vehicle 110 based on the one or more modified driving commands.

An example process 500 for correcting the one or more driving commands to generate the one or more modified driving commands is illustrated below with reference to FIG. 5.

In some embodiments, the one or more modified driving commands control an operation of the ego vehicle 110 to satisfy the trajectory safety requirement. For example, the trajectory safety requirement includes a lane-of-travel requirement. The one or more modified driving commands control the ego vehicle 110 to operate within an intended lane of travel (e.g., a correct lane of travel) on a roadway so that the ego vehicle 110 does not deviate from the intended lane of travel. The intended lane of travel may be determined by the model data that is provided by the machine learning system 191. In another example, the trajectory safety requirement includes a collision-avoidance requirement. The one or more modified driving commands control the ego vehicle 110 to maintain a safe distance relative to another vehicle present on the roadway of the ego vehicle 110 so that a potential collision with the other vehicle is avoided. The other vehicle may be ahead of the ego vehicle 110, behind the ego vehicle 110 or at any location that is in the vicinity of the ego vehicle 110. A value for the safe distance can be no less than a certain threshold (e.g., a length of the vehicle, twice of the length of the vehicle, 3 times of the length of the vehicle or any other suitable value, etc.).

In some embodiments, the one or more modified driving commands control the ego vehicle 110 to operate in a manner consistent with the model data provided by the machine learning system 191. For example, assume that the model data indicates that a driver of the ego vehicle 110 prioritizes economy for fuel consumption over other considerations such as a travel time. The one or more modified driving commands may control the ego vehicle 110 to operate in a manner like that when the ego vehicle 110 is driven by the driver of the ego vehicle 110 at least by controlling the ego vehicle 110 to travel smoothly to reduce fuel consumption.

In some embodiments, the one or more driving commands include one or more of a steering command, a throttle command, and a braking command. The one or more modified driving commands include a modified version of the one or more of the steering command, the throttle command, and the braking command.

The implementation module 206 can be software including routines for implementing the one or more modified driving commands for the ego vehicle 110. In some embodiments, the implementation module 206 can be stored in the memory 127 of the computer system 200 and can be accessible and executable by the processor 125. The implementation module 206 may be adapted for cooperation and communication with the processor 125 and other components of the computer system 200 via a signal line 226.

In some embodiments, the implementation module 206 modifies an operation of the vehicle control system 156 based on the modified command data so that the ego vehicle 110 operates based on the one or more modified driving commands. Through an execution of the one or more modified driving commands by the vehicle control system 156, the ego vehicle 110 is steered in a way by the vehicle control system 156 that maintains a correct lane of travel. The ego vehicle 110 is also accelerated or braked by the vehicle control system 156 in a way that maintains a safe distance relative to any other vehicle traveling in the vicinity of the ego vehicle 110.

Example Processes

Figure 3:
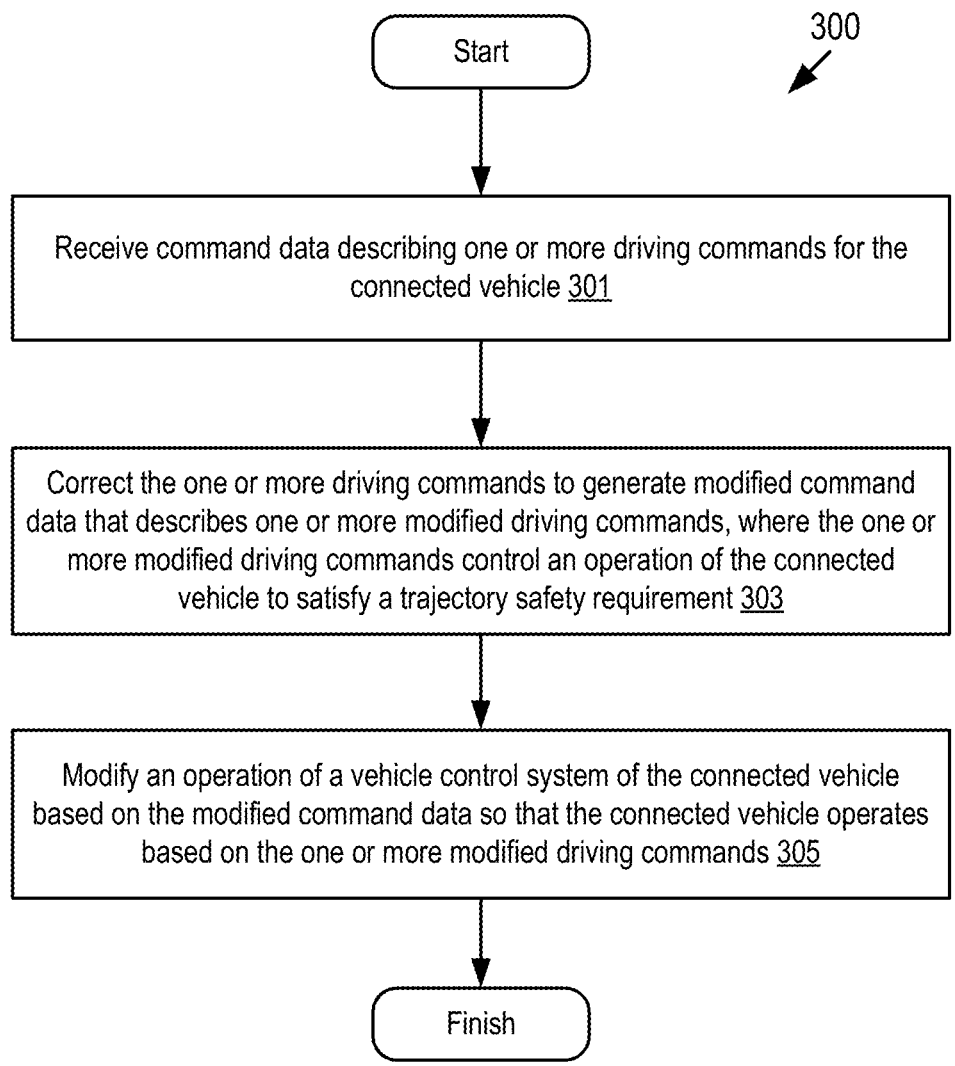
FIG. 3 depicts a method for improving driving commands for vehicular end-to-end driving according to some embodiments.

Referring now to FIG. 3, depicted is a flowchart of an example method 300 for improving driving commands for vehicular end-to-end driving according to some embodiments. The steps of the method 300 are executable in any order, and not necessarily the order depicted in FIG. 3. The method 300 may be executed by the feedback system 199 of a connected vehicle to improve the driving commands of the connected vehicle. The connected vehicle can be the ego vehicle 110 or the remote vehicle 112.

At step 301, the correction module 204 receives command data describing one or more driving commands for the connected vehicle from the machine learning system 191.

At step 303, the correction module 204 corrects the one or more driving commands to generate modified command data that describes one or more modified driving commands for the connected vehicle. The one or more modified driving commands control an operation of the connected vehicle to satisfy a trajectory safety requirement.

At step 305, the implementation module 206 modifies an operation of the vehicle control system 156 of the connected vehicle based on the modified command data so that the connected vehicle operates based on the one or more modified driving commands.

Figure 4:
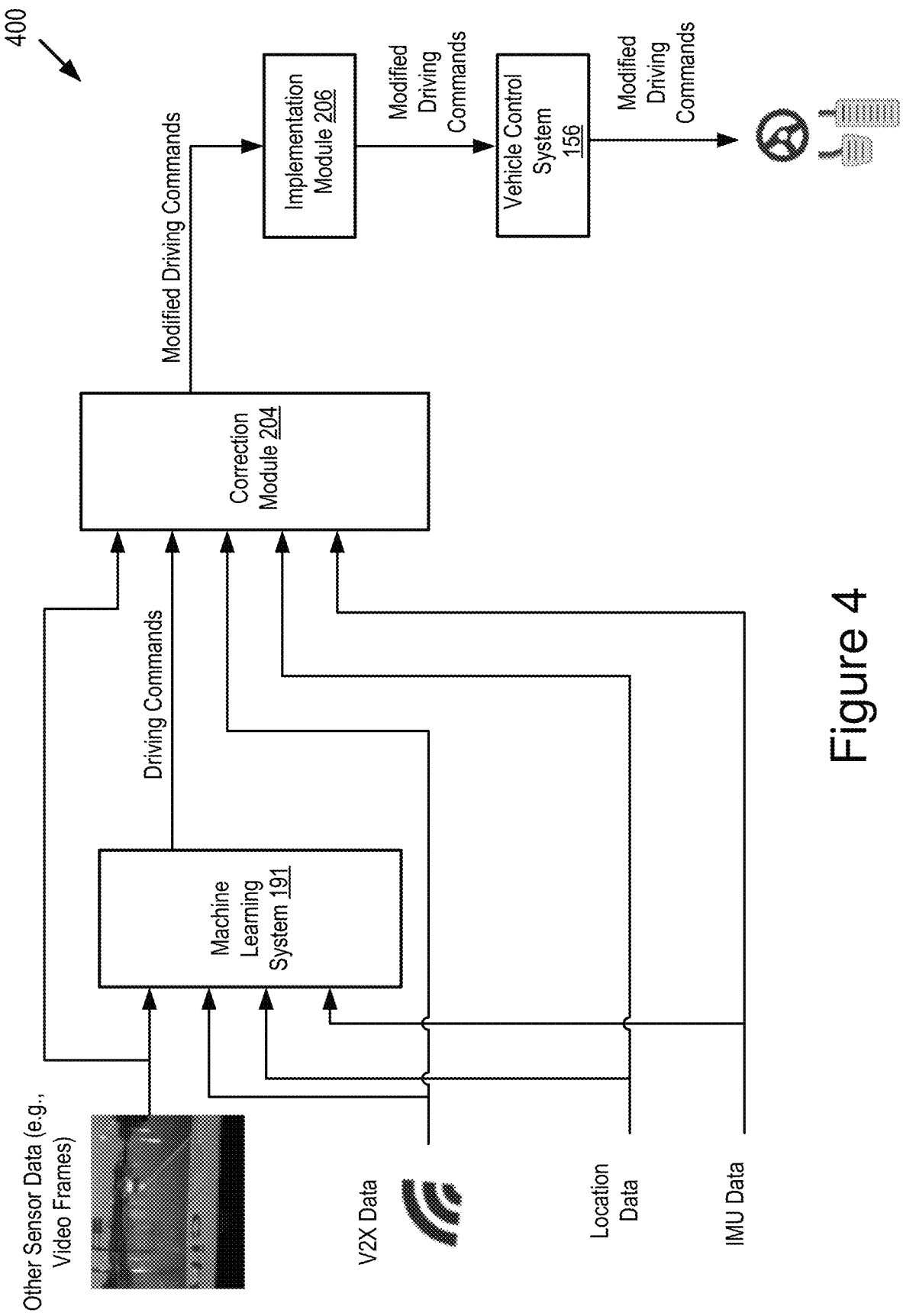
FIG. 4 is a graphical representation illustrating an example process for improving driving commands for vehicular end-to-end driving according to some embodiments.

FIG. 4 is a graphical representation illustrating an example process 400 for improving driving commands for vehicular end-to-end driving according to some embodiments. The example process 400 can be executed by a connected vehicle. Here, assume that the connected vehicle is the ego vehicle 110 without loss of generality.

In the example process 400, the machine learning system 191 receives one or more of: (1) V2X data from one or more remote vehicles 112; (2) location data from the GPS unit 150 of the ego vehicle 110; and (3) IMU data from the IMU 153 of the ego vehicle 110. The machine learning system 191 may also receive other sensor data (e.g., video frames) from the sensor set 154.

The machine learning system 191 may include a convolutional recurrent neural network that analyzes the one or more of the V2X data, the location data, the IMU data and the other sensor data to generate one or more driving commands for the ego vehicle 110. The one or more driving commands may include a sequence of steering-angle commands, a sequence of throttle commands, a sequence of braking commands, or any combination thereof. The machine learning system 191 outputs the one or more driving commands to the correction module 204 of the feedback system 199 installed in the ego vehicle 110.

The correction module 204 may modify the one or more driving commands to generate one or more modified driving commands based on one or more of the V2X data, the location data, the IMU data and the other sensor data. For example, the one or more modified driving commands may include a sequence of modified steering-angle commands, a sequence of modified throttle commands, a sequence of modified braking commands, or any combination thereof. The generation of the one or more modified driving commands is described below in more detail with reference to FIG. 5.

The correction module 204 sends modified command data describing the one or more modified driving commands to the implementation module 206. The implementation module 206 modifies an operation of the vehicle control system 156 based on the modified command data so that the vehicle control system 156 controls an operation of the ego vehicle 110 based on the one or more modified driving commands. For example, the vehicle control system 156 may apply the sequence of modified steering-angle commands and the sequence of modified throttle commands to a steering wheel and an accelerator of the ego vehicle 110, respectively. In another example, the vehicle control system 156 further applies the sequence of modified braking commands to a brake of the ego vehicle 110.

Figure 5:
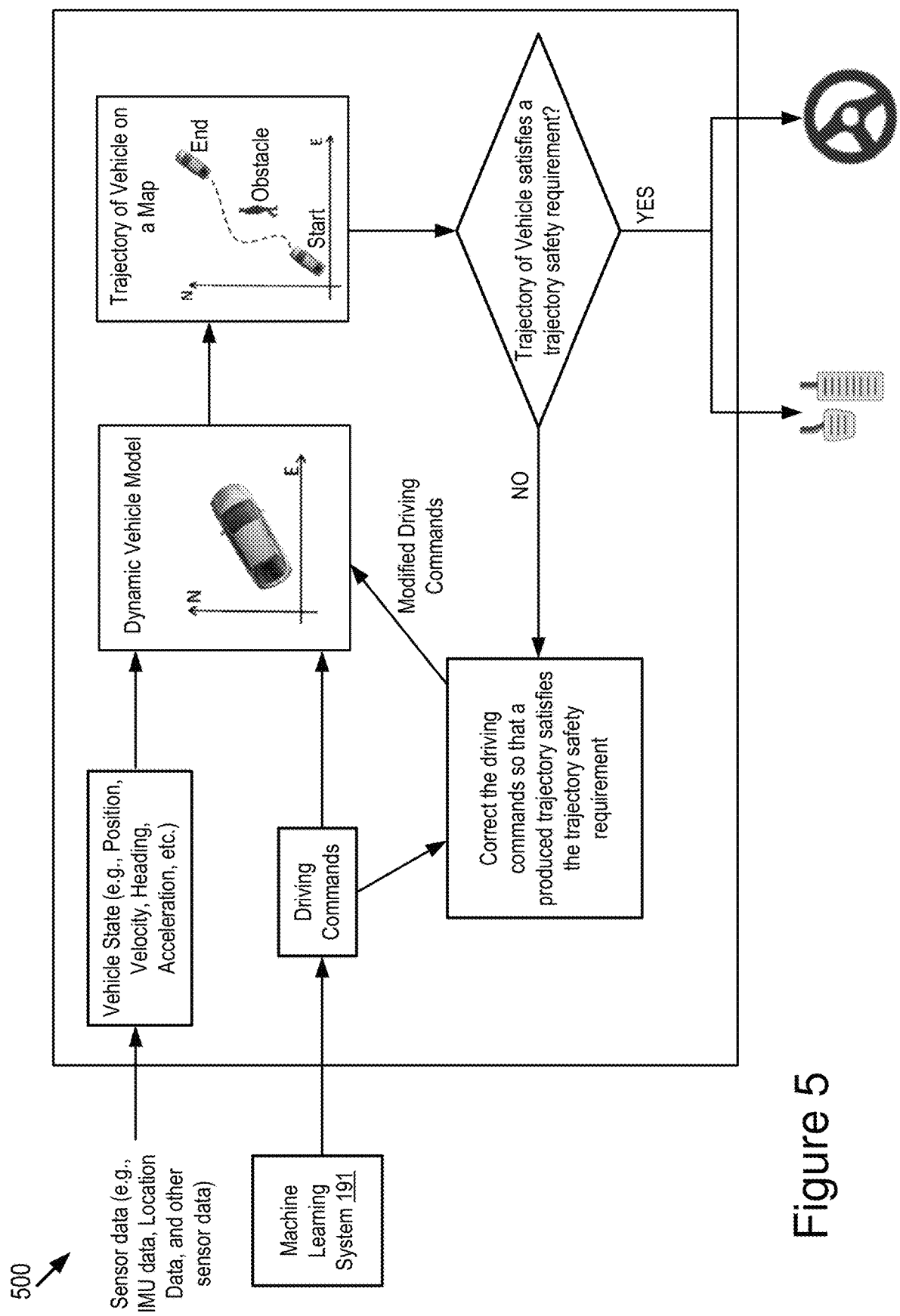
FIG. 5 is a graphical representation illustrating an example process for correcting driving commands to generate modified driving commands according to some embodiments.

Referring to FIG. 5, the example process 500 for correcting driving commands to generate modified driving commands is illustrated according to some embodiments. In the example process 500, the machine learning system 191 outputs one or more driving commands and model data to the correction module 204. The correction module 204 receives sensor data (e.g., IMU data, location data, and other sensor data such as camera data, radar data, range data, etc.) of the ego vehicle 110. The correction module 204 determines an initial vehicle state of the ego vehicle 110 based on the sensor data. Here, the initial vehicle state of the ego vehicle 110 may be described by one or more of a position, a velocity, a heading, and an acceleration, etc., of the ego vehicle 110. The correction module 204 may also receive V2X data from one or more remote vehicles 112.

The correction module 204 may use the one or more driving commands and one or more of the V2X data, the location data, the IMU data and the other sensor data as inputs to a vehicle model and apply the vehicle model to infer a trajectory of the ego vehicle 110. The vehicle model may be a dynamic vehicle model that can be used to estimate a trajectory of the ego vehicle 110 based on the above inputs and the initial vehicle state of the ego vehicle 110. In some embodiments, the vehicle model is a driving model described by the model data outputted by the machine learning system 191.

For example, the correction module 204 determines a driving environment based on the one or more of the V2X data of the remote vehicles 112, the location data, the IMU data and the other sensor data of the ego vehicle 110. The driving commands provided by the machine learning system 191 includes sequences of steering-angle commands, throttle commands, braking commands, or any combination thereof. Then, based on the vehicle model, the correction module 204 may simulate a trajectory of the ego vehicle 110 by applying the sequences of steering-angle commands, throttle commands, braking commands, or any combination thereof, under the driving environment.

Next, the correction module 204 depicts the trajectory of the ego vehicle 110 on a map that depicts a roadway environment where the ego vehicle 110 is present. The correction module 204 determines whether the trajectory of the ego vehicle 110 satisfies a trajectory safety requirement. For example, the correction module 204 determines whether the trajectory ensures that (1) the ego vehicle 110 travels on the intended lane of travel and (2) a safe distance is kept between the ego vehicle 110 and another vehicle travelling ahead of or behind the ego vehicle 110. If the trajectory can ensure that (1) the ego vehicle 110 travels on the intended lane of travel and (2) the safe distance is kept between the ego vehicle 110 and the other vehicle, the trajectory safety requirement is satisfied. However, if the trajectory indicates that the ego vehicle 110 does not travel on the intended lane of the travel or the safe distance is not kept between the ego vehicle 110 and the other vehicle, the trajectory safety requirement is not satisfied.

Responsive to determining that the trajectory of the ego vehicle 110 satisfies the trajectory safety requirement, the correction module 204 sends the driving commands to the vehicle control system 156. In this case, the vehicle control system 156 controls an operation of the ego vehicle 110 based on the driving commands.

Responsive to determining that the trajectory of the ego vehicle 110 does not satisfy the trajectory safety requirement, the correction module 204 corrects the driving commands. The correction module 204 generates modified driving commands so that a produced trajectory that is inferred based on the modified driving commands satisfies the trajectory safety requirement.

For example, the correction module 204 infers the produced trajectory of the ego vehicle 110 based on the modified driving commands, depicts the produced trajectory on the map, and determines whether the produced trajectory satisfies the trajectory safety requirement. Responsive to determining the produced trajectory satisfies the trajectory safety requirement, the correction module 204 sends the modified driving commands to the vehicle control system 156. In this case, the vehicle control system 156 controls an operation of the ego vehicle 110 based on the modified driving commands. For example, the vehicle control system 156 may apply a sequence of modified steering-angle commands to a steering wheel of the ego vehicle 110. In another example, the vehicle control system 156 further applies a sequence of modified throttle commands to an accelerator of the ego vehicle 110. In yet another example, the vehicle control system 156 further applies a sequence of modified braking commands to a brake of the ego vehicle 110.

However, responsive to determining that the produced trajectory of the ego vehicle 110 does not satisfy the trajectory safety requirement, the correction module 204 re-corrects the modified driving commands again. By repeating operations described above, the correction module 204 may generate modified driving commands that enable a produced trajectory of the ego vehicle 110 to satisfy the trajectory safety requirement.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer program product comprising a non-transitory memory of an onboard vehicle computer system of a connected vehicle storing computer-executable code that, when executed by a processor, causes the processor to:

generate model data that describes how to drive the connected vehicle as a specific human would drive the connected vehicle in different contexts based at least in part on non-real-time sensor measurements including inertia measurements in the different contexts and location data describing lanes of travel in the different contexts;

generate command data based at least in part on model data and first real-time sensor data that describes a current context of the connected vehicle, wherein the command data is operable to operate the connected vehicle as the specific human would in the current context;

execute, responsive to an operation of the connected vehicle based on the command data, a feedback system that provides a feedback loop that verifies that the connected vehicle is being operated consistent with how the specific human would in the current context;

correct, responsive to a determination by the feedback system that the connected vehicle is not being operated consistent with how the specific human would in the current context, the one or more driving commands to generate modified command data that describes one or more modified driving commands that guarantee the connected vehicle is operated consistent with how the specific human would in the current context, wherein the one or more modified driving commands control the connected vehicle to operate consistent with how the specific human would in the current context including ensuring that inertia measurements and a specific lane of travel are consistent with the model data for the current context; and modify an operation of a vehicle control system of the connected vehicle based on the modified command data so that the connected vehicle operates based on the one or more modified driving commands.

2. The computer program product of claim 1, wherein the computer-executable code, when executed by the processor, further causes the processor to:

receive second real-time sensor data from the connected vehicle that depict how a driver of the connected vehicle operates the connected vehicle in a different context;

input the second real-time sensor data to a complex convolutional neural network; and receive the modified command data as output from the complex convolutional neural network.

3. The computer program product of claim 1, wherein the computer-executable code, when executed by the processor, causes the processor to correct the one or more driving commands to generate the modified command data at least by:

receiving image data from one or more sensors of the connected vehicle and Vehicle-to-Everything (V2X) data from one or more other endpoints; and correcting the one or more driving commands to generate the one or more modified driving commands based at least in part on the image data and the V2X data.

4. The computer program product of claim 1, wherein:

the one or more driving commands include one or more of a steering command, a throttle command, or a braking command; and the one or more modified driving commands include a modified version of the one or more of the steering command, the throttle command, or the braking command.

5. A method for a connected vehicle, comprising:

generate model data that describes how to drive the connected vehicle as a specific human would drive the connected vehicle in different contexts based at least in part on non-real-time sensor measurements including inertia measurements in the different contexts and location data describing lanes of travel in the different contexts;

generating command data based at least in part on model data and first real-time sensor data that describes a current context of the connected vehicle, wherein the command data is operable to operate the connected vehicle as the specific human would in the current context;

executing, responsive to an operation of the connected vehicle based on the command data, a feedback system that provides a feedback loop that verifies that the connected vehicle is being operated consistent with how the specific human would in the current context;

correcting, responsive to a determination by the feedback system that the connected vehicle is not being operated consistent with how the specific human would in the current context, the one or more driving commands to generate modified command data that describes one or more modified driving commands that guarantee the connected vehicle is operated consistent with how the specific human would in the current context, wherein the one or more modified driving commands control the connected vehicle to operate consistent with how the specific human would in the current context including ensuring that inertia measurements and a specific lane of travel are consistent with the model data for the current context; and modifying an operation of a vehicle control system of the connected vehicle based on the modified command data so that the connected vehicle operates based on the one or more modified driving commands.

6. The method of claim 5, wherein the model data indicates a priority that the specific human prioritizes fuel efficiency over travel time and the modified command data is updated consistent with the priority.

7. The method of claim 5, wherein the feedback loop operates continuously so long as the connected vehicle is operated to guarantee that the connected vehicle is continuously operated consistent with the model data.

8. The method of claim 5, further comprising:
receiving second real-time sensor data from the connected vehicle that depict how a driver of the connected vehicle operates the connected vehicle in a different context;
inputting the second real-time sensor data to a complex convolutional neural network; and
receiving the modified command data as output from the complex convolutional neural network.

9. The method of claim 5, wherein correcting the one or more driving commands to generate the modified command data that describes the one or more modified driving commands comprises:
receiving image data from one or more sensors of the connected vehicle and Vehicle-to-Everything (V2X) data from one or more other endpoints; and
correcting the one or more driving commands to generate the one or more modified driving commands based at least in part on the image data and the V2X data.

10. The method of claim 9, wherein correcting the one or more driving commands to generate the one or more modified driving commands based on the image data and the V2X data comprises:
inferring a trajectory of the connected vehicle based on the one or more driving commands and the image data and the V2X data; and
responsive to determining that the trajectory of the connected vehicle does not satisfy a trajectory safety requirement included in the model data, modifying the one or more driving commands to form the one or more modified driving commands so that a modified trajectory that satisfies the trajectory safety requirement is produced for the connected vehicle based on the modified driving commands.

11. The method of claim 9, wherein receiving the image data from the one or more sensors further includes receiving one or more of location data describing a geographic location of the connected vehicle and inertial measurement data received from an inertial measurement unit of the connected vehicle.

12. The method of claim 5, wherein:
the one or more driving commands include one or more of a steering command, a throttle command, and a braking command; and
the one or more modified driving commands include a modified version of the one or more of the steering command, the throttle command, or the braking command.

13. A system comprising:
an onboard vehicle computer system of a connected vehicle including a non-transitory memory storing computer code which, when executed by the onboard vehicle computer system, causes the onboard vehicle computer system to:
generate model data that describes how to drive the connected vehicle as a specific human would drive the connected vehicle in different contexts based at least in part on non-real-time sensor measurements including inertia measurements in the different contexts and location data describing lanes of travel in the different contexts;
generate command data based at least in part on model data and first real-time sensor data that describes a current context of the connected vehicle, wherein the command data is operable to operate the connected vehicle as the specific human would in the current context;
execute, responsive to an operation of the connected vehicle based on the command data, a feedback system that provides a feedback loop that verifies that the connected vehicle is being operated consistent with how the specific human would in the current context;
correct, responsive to a determination by the feedback system that the connected vehicle is not being operated consistent with how the specific human would in the current context, the one or more driving commands to generate modified command data that describes one or more modified driving commands that guarantee the connected vehicle is operated consistent with how the specific human would in the current context, wherein the one or more modified driving commands control the connected vehicle to operate consistent with how the specific human would in the current context including ensuring that inertia measurements and a specific lane of travel are consistent with the model data for the current context; and
modify an operation of a vehicle control system of the connected vehicle based on the modified command data so that the connected vehicle operates based on the one or more modified driving commands.

14. The system of claim 13, wherein the model data indicates a priority that the specific human prioritizes fuel efficiency over travel time and the modified command data is updated consistent with the priority.

15. The system of claim 13, wherein the feedback loop operates continuously so long as the connected vehicle is operated to guarantee that the connected vehicle is continuously operated consistent with the model data.

16. The system of claim 13, wherein the computer code, when executed by the onboard vehicle computer system, further causes the onboard vehicle computer system to:

receive second real-time sensor data from the connected vehicle that depict how a driver of the connected vehicle operates the connected vehicle in a different context;

input the second real-time sensor data to a complex convolutional neural network; and receive the modified command data as output from the complex convolutional neural network.

17. The system of claim 13, wherein the computer code, when executed by the onboard vehicle computer system, causes the onboard vehicle computer system to correct the one or more driving commands to generate the modified command data that describes the one or more modified driving commands at least by:

receiving image data from one or more sensors of the connected vehicle and Vehicle-to-Everything (V2X) data from one or more other endpoints; and correcting the one or more driving commands to generate the one or more modified driving commands based at least in part on the image data and the V2X data.

18. The system of claim 17, wherein the computer code, when executed by the onboard vehicle computer system, causes the onboard vehicle computer system to correct the one or more driving commands to generate the one or more modified driving commands based on the image data and the V2X data at least by:

inferring a trajectory of the connected vehicle based on the one or more driving commands and the image data and the V2X data; and responsive to determining that the trajectory of the connected vehicle does not satisfy a trajectory safety requirement included in the model data, modifying the one or more driving commands to form the one or more modified driving commands so that a modified trajectory that satisfies the trajectory safety requirement is produced for the connected vehicle based on the modified driving commands.

19. The system of claim 17, wherein receiving the image data from the one or more sensors further includes receiving one or more of location data describing a geographic location of the connected vehicle and inertial measurement data received from an inertial measurement unit of the connected vehicle.

20. The system of claim 13, wherein:

the one or more driving commands include one or more of a steering command, a throttle command, and a braking command; and the one or more modified driving commands include a modified version of the one or more of the steering command, the throttle command, and the braking command.

\* \* \* \* \*